E. D. TILLYER.
LENS.
APPLICATION FILED JUNE 24, 1919.
1,393,853.
Patented Oct. 18, 1921.
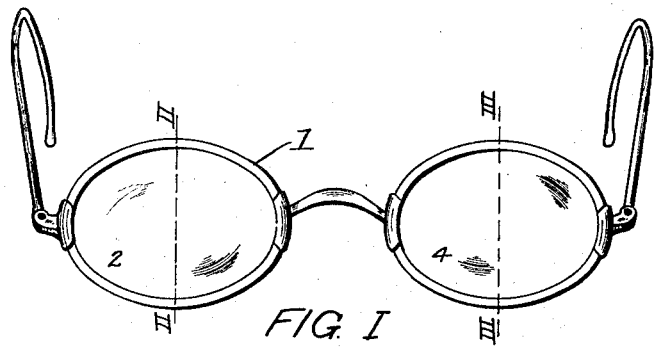
FIG. I
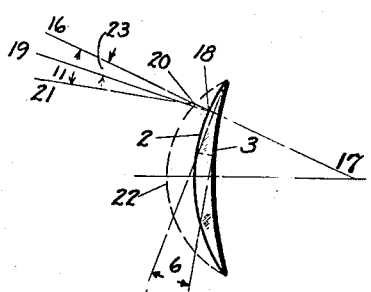
FIG. II
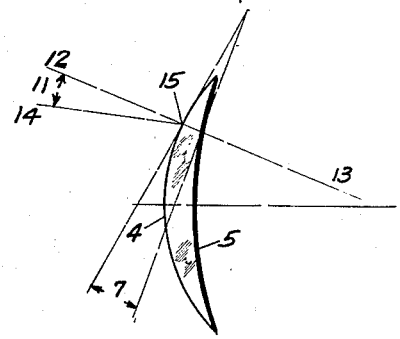
FIG. III
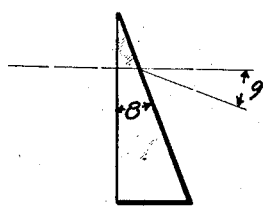
FIG. IV
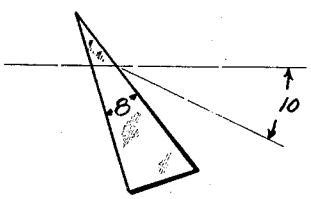
FIG. V
INVENTOR
E. D. TILLYER
BY
H. H. Styll  H. K. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

1,393,853.  Specification of Letters Patent.  Patented Oct. 18, 1921.

Application filed June 24, 1919. Serial No. 306,369.

*To all whom it may concern:*

Be it known that I, EDGAR D. TILLYER, a citizen of the United States, residing at Southbridge, in the county of Worcester and State of Massachusetts, have invented certain new and useful Improvements in Lenses, of which the following is a specification.

This invention relates to ophthalmic lenses intended for use in the correction of errors of vision, and has particular reference to a pair of ophthalmic lenses, one for each eye, corrected to equalize the oblique vision in the two lenses, and to a process for manufacturing such lenses.

The principal object of the invention is to provide a pair of lenses, one for each eye, in which the distortions of oblique vision will be equalized in order to insure the eyes acting in harmony with each other, instead of placing an unequal load on each eye, as hitherto. That is to say, a pair of lenses that will correct the unbalanced pull on the two eyes.

Other objects and advantages of the invention will be readily apparent by reference to the following specification taken in connection with the accompanying drawings, and it will be understood that I may make any modifications in the specific details of construction or steps shown and described within the scope of the appended claims without departing from or exceeding the spirit of my invention, the preferred form only being shown and described for sake of illustration.

To facilitate an understanding of the features hereinafter referred to, I have appended a sheet of drawings, illustrative of the same. Similar references throughout the specification and drawings refer to similar parts.

Figure I represents the front view of a pair of spectacles provided with lenses of this invention.

Fig. II represents a diagrammatic section on line II—II of Fig. I, showing the prismatic angle of one lens.

Fig. III represents a diagrammatic section on line III—III of Fig. I, showing the prismatic angle of the other lens.

Fig. IV is a diagrammatic sectional view of a prism showing the angle of deflection of light therethrough, when the prism is placed upright.

Fig. V represents a diagrammatic sectional view through the same prism showing the angle of deflection of light therethrough when the prism is tilted.

It is a recognized fact that one eye cannot be raised more than the other without serious inconvenience, as for instance where a slight prism with its base upward or with its base downward is placed in front of one eye extreme headache will be caused.

This will occur where a person has a different power lens for each eye, as for instance, plus one diopter for the right eye, and plus four diopters for the left eye. As far as I am aware there is at present no known method of eliminating this difficulty in oblique vision.

In my invention I propose to obtain this result by changing the curvature on one of the lenses of the pair so that its distortion will be equal to that of the other lens. This cannot be done by changing the ratio of the first to the second curve because there would be great astigmatism introduced therein by that process, but it may be done by deforming the lens surface and at the same time so adjusting the ratio of the curve on one side to the curve on the other side of the lens. For a slight change in the powers of the two lenses this may be done by a small shift of the ratio of one side to the other without introducing a great deal of astigmatism, but in general a deformed surface would be required. The correction may be made in only one lens of a pair, where the one is made to correspond with the other or both lenses may be adjusted to give a distortion common to both, whichever is found to give the best results in any one particular prescription.

It is a well known fact that a prism will refract the light toward its thickest portion. It is also known that an inclined or tilted prism such as shown in Fig. V, will deflect the light to greater extent than one which is upright, as shown in Fig. IV; that is to say, the angle 10 in Fig. V is greater than the angle 9 in Fig. IV. Both prisms have the same face angle, 8, Figs. IV and V. It is also well known that by inclining or tilting a prism the image may be displaced.

Referring to the drawings, the lenses 2—3 and 4—5 are held in place before the eyes exactly the same way as ordinary ophthalmic lenses are held, in some kind of an ophthalmic mounting, such as a spectacle frame, or eyeglass mounting indicated at 1 in Fig. I. Each lens comprises a front surface 2 or 4, and a rear surface 3 or 5, Figs. II and III. The dot and dash lines in Figs. II and III represent the prismatic angle of the upper portions of each lens, that in Fig. II being represented by 6, and that of Fig. III by 7. It will be noted that the angle 7 is greater than the angle 6; therefore, there will be a stronger pull downward on the eye in Fig. III than there will be in Fig. II. This will set up an unbalance and cause eye strain. My invention is intended to equalize this unbalance.

Referring to Fig. III, a ray of light 12—13 will be refracted from the surface 4, at the point 15 along the line 14—15, or at an angle of displacement 11. Now, referring to Fig. II, a ray of light 16—17 will be refracted from the face 2 of the lens along the line 18—19, from the point 18, and the deflected angle 23 will be seen to be less than 11 of Fig. III. It is our problem to equalize 11 and 23. If we sharpen the curvature of the face 2, Fig. II, to 22, we find that the angle 16—20—21 will be equal to 11. In sharpening the curvature of the lens, Fig. II, we do it in such a way as not to alter the power; that is the relationship of the front and back curves will be such as to give the same desired power. What I have done is equivalent to revolving or tilting a prism, throwing it around until I get the displacement where I desire it. Of course, it will be understood that I could have changed the lens in Fig. III to correspond with Fig. II, or I could have changed both lenses, bringing them to a common displacement, whichever is found to give the best results, or the best or most gainly looking lens.

After the alteration for displacement has been made it may be found that astigmatism or other optical errors may have been introduced into the lens, particularly in the marginal portions. To remove this it is first necessary to ascertain just what the errors are; they may be coma, focus, or astigmatism, etc. Then having located the errors and their amount they are removed by deforming the curve or curves, i. e., front and back, in such a way as to retain the desired power and displacement. These deformed curves, i. e., a curve that departs from the regular spherical or cylindrical or toric, may be obtained by grinding locally the spots desired to be changed by means of the fingertips or other abrading tools locally applied, such as are used in preparing telescopic lenses, or the results may be obtained by grinding some regular mathematical curve, such as a parabola, on machinery designed to travel in such a mathematical path. When ground locally the lenses are first ground and then altered afterward; where mathematical curves are used the changes are made in the computation and the lens ground to the finished curves.

The completed result will be a pair of lenses having the desired prescriptive power, free from errors in the marginal portions, and having the same amount of prismatic distortion or displacement in each, which result has been obtained by shaping the face of the lens to get the desired displacement, just as a prism is swung around, and then deforming a surface or surfaces, either in the lenses themselves or in the computations, as the case may be, to remove any optical errors introduced in the change, and at the same time any marginal errors that may be present.

The computations are made just the same as for any ophthalmic lens by well known formulæ found in optical text books and treatises, and the surfaces are ground and finished like the surfaces of any other optical lenses and are prepared to fit the usual commercial frames and mountings.

Having described my invention, what I claim is:

1. A pair of glasses comprising a lens for each eye of the wearer in which the lenses have different focal values, and in which the curves of one lens are adjusted with respect to the other to equalize the marginal prismatic displacement.

2. A pair of glasses comprising a lens for each eye of the wearer in which the lenses have different focal values, and in which the curves of one lens are adjusted with respect to the other to equalize the marginal prismatic displacement as respects the vertical meridian.

3. A pair of ophthalmic lenses one for each eye of unequal power, having curves related to give the required prescriptive powers, said curves being modified to produce equal oblique displacement in the lenses of different powers and having deformed portions to correct departures from the desired optical powers.

4. A pair of lenses for joint use before the eyes having different dioptric values, said lenses being centrally free from prismatic displacement and having substantially equal marginal displacement at corresponding points.

In testimony whereof I have affixed my signature in presence of two witnesses.

EDGAR D. TILLYER.

Witnesses:
HARRY H. STYLL,
H. K. PARSONS.